UNITED STATES PATENT OFFICE.

FREDERICK COWIN, OF CHICAGO, ILLINOIS, ASSIGNOR TO THE ANGLO AMERICAN PROVISION COMPANY, OF CHICAGO, ILLINOIS, A CORPORATION OF ILLINOIS.

PROCESS OF PRESERVING FOOD PRODUCTS.

990,113.  Specification of Letters Patent.  Patented Apr. 18, 1911.

No Drawing.   Application filed September 16, 1910.   Serial No. 582,328.

*To all whom it may concern:*

Be it known that I, FREDERICK COWIN, a subject of the King of England, residing at Chicago, in the county of Cook and State of Illinois, have invented certain new and useful Improvements in Processes of Preserving Food Products, of which the following is a specification.

This invention relates to a new and useful process of coating meats, fruits and other substances used as food for human consumption and wherein the food product is given a protective covering.

Many attempts have been made to provide an impermeable cover or skin for putrescible substances and especially substances used as food. For certain purposes, such as the closing of vessels in which potted-meats, jams, etc., have been placed, various protective and air-tight skins have been applied with a fair measure of success; but in the case of more extensive and less-uniform surfaces than the orifice of a jar or vessel it has not been found practicable to apply a preservative skin or coating which shall be at the same time perfectly reliable, free from any poisonous ingredient, sufficiently inexpensive in the first cost, and capable of being applied with but little trouble. Now my invention provides such a covering, and this covering is applicable to any description of surfaces however complicated, moist or otherwise difficult of treatment. For instance, I have found my invention of a special service in the preservation of hams, bacon and the like, whether in the cooked state or mildly cured or otherwise, and experiments with such preserved meats in tropical countries, where, owing to the prevailing heat and moisture present in the atmosphere, it becomes extremely difficult to retain such goods in proper condition, have demonstrated that the method hereinafter set forth affords a thoroughly reliable and permanent protection to the articles to which it is applied.

With the above and other objects in view my present invention consists of the process and the combination of ingredients used therein, which I will hereinafter describe and claim.

In order more fully to set forth my invention and the way in which the same may be practically carried into effect, I will describe the same with special reference to the preservation of hams and bacon. As these goods contain a certain amount of natural moisture and also are of a greasy nature, it is first necessary to cover them with a suitable thin paper, such as tissue-paper prepared to resist moisture by any of the well-known methods. A covering of this tissue-paper is first applied to the surface of the ham or bacon. There is then drawn over the article a cotton fabric consisting of a sleeve or envelop of fine knitted material, such as is already used for covering many kinds of goods to protect them against outer influences. After this elastic knitted fabric has been drawn over the ham or the like and suitably secured in place by string or otherwise, the whole is then immersed in, or otherwise subjected to a bath of, the preservative compound.

This compound, which is the essential characteristic of the present invention, consists essentially of a preparation of gelatin or glue with sulfate of iron. The gelatin or glue is heated to the consistency of syrup after the addition of sufficient water. Into this solution is then mixed, while in this heated state, a hot solution of sulfate of iron in water, a solution containing, say, five pounds of sulfate of iron in thirty pounds of water or thereabout. In certain cases, a little harmless coloring matter may be added to obtain the desired tint of the covering to be produced. In this solution, while in the hot state, the products or substances to be coated are dipped. They are then removed and hung up to dry. When dry they are found to be coated with an impervious skin of antiseptic qualities, which is permanently air-tight and reasonably resistant to moisture, being, moreover, not in the least hygroscopic, as would be the case with unprepared gelatin or glue.

The preservative compound by reason of its being composed of gelatin or glue, and sulfate of iron, mixed in solution, dries very quickly and becomes hard and tough, as it dries and remains evenly distributed. This would not be so if the fabric were treated with gelatin or glue and then the other ingredients subsequently applied to the gelatin or glue as has heretofore been proposed. In such case, the gelatin or glue would be very slow in drying and would not become perfectly dry until after a period altogether too long for practical use. It would be unevenly distributed and would continue to run and accumulate at the lowest spot. Furthermore, the sulfate of iron subsequently applied would never become thoroughly intermingled with the gelatin, and would have but very little, if any, hardening effect and this would be confined to the exterior portion of the gelatin. The covering is moreover, closely adherent to the provision or substance protected, because any air which may be existing between the covering or the tissue-paper and the article enveloped is expelled by the dipping process. Consequently as long as the skin is preserved uninjured, the article within is practically isolated against any influence which can cause decomposition. It is, moreover, found that the operation in no wise injures the flavor of the articles treated, and, on the contrary, by preserving the natural aroma and moisture of the fresh goods it greatly increases their quality in respect to flavor, etc., if they have to be kept for a considerable time in an unfavorable climate, as compared with goods kept under ordinary conditions.

Although the proportions above given and the method of effecting the coating are those which I have found by experiment to best fulfil the purpose in view, I wish to state that I give the above by way of example, and that I do not limit myself to the precise proportions and mode of operation therein stated.

While the wrapping of the food in the fabric covering is not essential to the coating of said food by dipping it into the bath herein described, I prefer that the food shall first be covered with the fabric before being subjected to the dipping process.

Having thus described my invention, what I claim as new and desire to secure by Letters Patent is:

1. The herein described process of preserving food products, which process comprises, essentially, dipping the product into a bath which includes a gelatinous substance and sulfate of iron in solution.

2. The herein described process of preserving food products, which process comprises, essentially, dipping the product into a solution composed of a gelatinous substance and sulfate of iron in solution, in substantially equal parts.

3. The herein described process of preserving food products and which process consists in enveloping the product first in a skin or thin material, and then in a fabric cover; preparing a preservative compound by mixing together gelatin and sulfate of iron in solution; and finally treating the fabric cover with the preservative compound thus prepared.

4. The herein described process of preserving food products, which process consists in enveloping the product first in a skin or thin material and then in a fabric cover; preparing a preservative compound by mixing together a gelatinous substance and sulfate of iron in solution in substantially equal parts; and finally treating the fabric cover with the preservative compound thus prepared.

5. The herein described process of preserving food products, said process consisting in preparing a preservative compound by mixing together a gelatinous substance and sulfate of iron in solution, and subjecting the product to treatment with said solution.

6. The herein described process of preserving food products, said process consisting in enveloping the product first in tissue-paper treated to make it moisture-proof and then in a fabric cover; preparing a solution of sulfate of iron in the proportions of approximately five pounds of sulfate of iron to thirty pounds of water, by weight; mixing this solution with an approximately equal amount of gelatin when both are in a heated condition; and then treating the fabric cover with the solution thus made.

7. The process herein described of preserving food products, which consists in inclosing the product in a sheath or covering and then subjecting said covering to the action of a solution composed, essentially, of a gelatinous substance and sulfate of iron.

In testimony whereof I affix my signature in presence of two witnesses.

FREDERICK COWIN.

Witnesses:
MAX McCAHILL,
ROY MOHNS.